United States Patent
MacNeille et al.

(10) Patent No.: US 9,952,304 B2
(45) Date of Patent: Apr. 24, 2018

(54) VEHICLE POSITIONING SYSTEM

(71) Applicant: Ford Global Technologies, LLC, Dearborn, MI (US)

(72) Inventors: Perry Robinson MacNeille, Lathrup Village, MI (US); Oleg Yurievitch Gusikhin, West Bloomfield, MI (US); Dehua Cui, Northville, MI (US); John William Schmotzer, Canton, MI (US); Dave A. Herman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 9 days.

(21) Appl. No.: 14/849,627

(22) Filed: Sep. 10, 2015

(65) Prior Publication Data

US 2017/0075357 A1 Mar. 16, 2017

(51) Int. Cl.
  *G05D 1/02* (2006.01)
  *G01S 1/00* (2006.01)
  *H04B 10/116* (2013.01)

(52) U.S. Cl.
  CPC .............. *G01S 1/00* (2013.01); *G05D 1/0234* (2013.01); *H04B 10/116* (2013.01); *G05D 2201/0213* (2013.01)

(58) Field of Classification Search
  CPC ........................... G01S 1/00; G05D 2201/213
  USPC ........................... 382/104; 340/988; 701/28; 356/337–338; 348/135; 398/130, 118
  See application file for complete search history.

(56) References Cited

U.S. PATENT DOCUMENTS

| | | | |
|---|---|---|---|
| 4,773,018 A | 9/1988 | Lundström | |
| 5,200,793 A | 4/1993 | Ulich et al. | |
| 6,459,966 B2 | 10/2002 | Nakano et al. | |
| 8,203,443 B2* | 6/2012 | Bos | B60N 2/002 315/149 |
| 8,346,480 B2 | 1/2013 | Trepagnier et al. | |
| 8,421,880 B2* | 4/2013 | Sekiguchi | H04N 5/2357 348/228.1 |
| 9,454,154 B1* | 9/2016 | Safarik | G05D 1/0676 |
| 2002/0196340 A1* | 12/2002 | Kato | B60R 1/00 348/148 |
| 2007/0019181 A1 | 1/2007 | Sinclair et al. | |

(Continued)

FOREIGN PATENT DOCUMENTS

| | | |
|---|---|---|
| DE | 102014216269 A1 | 2/2016 |
| WO | WO 2015036912 | 3/2015 |
| WO | 2015077767 A1 | 5/2015 |

OTHER PUBLICATIONS

Temperature dependence of ultrasonic backscattered energy in motion compensated images; R. M. Arthur; J. V. Trobaugh; W. L. Straube; E. G. Moros; IEEE Transactions on Ultrasonics, Ferroelectrics, and Frequency Control; Year: 2005, vol. 52, Issue: 10; pp. 1644-1652, DOI: 10.1109/TUFFC.2005.1561620.*

(Continued)

*Primary Examiner* — Cuong H Nguyen
(74) *Attorney, Agent, or Firm* — Frank A. MacKenzie; Bejin Bieneman PLC

(57) ABSTRACT

A method including: receiving a synchronization signal and collecting a rolling shutter image of a modulated light on a sensor, determining a primary frequency from the rolling shutter image, and comparing the primary frequency to an expected primary frequency image to determine a directional movement related to a vehicle.

20 Claims, 5 Drawing Sheets

(56) References Cited

U.S. PATENT DOCUMENTS

| | | | | |
|---|---|---|---|---|
| 2013/0090541 | A1* | 4/2013 | MacFarlane | A61B 5/14553 600/328 |
| 2013/0182002 | A1* | 7/2013 | Macciola | H04N 1/387 345/589 |
| 2013/0188839 | A1* | 7/2013 | Abraham | G01M 17/04 382/104 |
| 2014/0022547 | A1* | 1/2014 | Knox | G01N 21/49 356/338 |
| 2014/0198184 | A1 | 7/2014 | Stein et al. | |
| 2015/0088373 | A1 | 3/2015 | Wilkins | |
| 2015/0147067 | A1* | 5/2015 | Ryan | H04B 10/116 398/118 |
| 2015/0280822 | A1* | 10/2015 | Breuer | G01C 3/08 398/130 |
| 2017/0075357 | A1* | 3/2017 | MacNeille | G01S 1/00 |

OTHER PUBLICATIONS

Biological approach for head motion detection and analysis; A. Benoit; A. Caplier; 2005 13th European Signal Processing Conference; Year: 2005; pp. 1-4.*

General direction-of-arrival tracking with acoustic nodes; V. Cevher; J. H. McClellan; IEEE Transactions on Signal Processing Year: 2005, vol. 53, Issue: 1; pp. 1-12, DOI: 10.1109/TSP.2004.838947.*

Application of Radio Frequency Controlled Intelligent Military Robot in Defense; Saradindu Naskar; Soumik Das; Abhik Kumar Seth; Asoke Nath; 2011 International Conference on Communication Systems and Network Technologies; Year: 2011; pp. 396-401, DOI: 10.1109/CSNT.2011.88.*

Feature-aided localization and tracking of ground vehicles using passive acoustic sensor networks; Vishal Cholapadi Ravindra; Yaakov Bar-Shalom; Thyagaraju Damarlay; 2009 3rd IEEE International Workshop on Computational Advances in Multi-Sensor Adaptive Processing (CAMSAP); Year: 2009; pp. 241-244, DOI: 10.1109/CAMSAP.2009.5413291.*

Coded exposure deblurring: Optimized codes for PSF estimation and invertibility; Amit Agrawal; Yi Xu; 2009 IEEE Conference on Computer Vision and Pattern Recognition; Year: 2009; pp. 2066-2073, DOI: 10.1109/CVPR.2009.5206685.*

Survey of indoor optical camera communication (OCC) systems for the Internet of lights ;Thanh Luan Vu et al.; 2017 International Conference on Information and Communication Technology Convergence (ICTC); Year: 2017; pp. 700-703 (IEEE Conferences).*

Rolling Shutter Absolute Pose Problem with Known Vertical Direction;Cenek Albl; Zuzana Kukelova; Tomas Pajdla; 2016 IEEE Conference on Computer Vision and Pattern Recognition (CVPR); year 2016; pp. 3355-3363 (IEEE Conferences).*

On Sensor Bias in Experimental Methods for Comparing Interest-Point, Saliency, and Recognition Algorithms Alexander Andreopoulos; John K. Tsotsos; IEEE Transactions on Pattern Analysis and Machine Intelligence; year 2012, vol. 34 issue 1; pp. 110-126 (IEEE Journals & Magazines).*

UK Search Report dated Feb. 13, 2017 (5 pages).

* cited by examiner

VEHICLE POSITIONING SYSTEM

BACKGROUND

A vehicle such as an automobile may be configured for autonomous driving operations. For example, the vehicle may include a central control unit or the like, i.e., a computing device having a processor and a memory, which receives data from various vehicle data collection devices such as sensors and generally also external data sources such as navigation information. The central control unit may then provide instructions to various vehicle components, e.g., actuators and the like that govern steering, braking, acceleration, etc., to control vehicle operations without action, or with reduced action, by a human operator.

The vehicle, whether operating in an autonomous mode, a semiautonomous mode, or a manual mode of operation, may require navigational assistance to traverse a path through an area, such as a parking facility or the like. Unfortunately, present mechanisms for navigating an autonomous vehicle or a semiautonomous vehicle in a self-directed way are lacking due to the current limitations of presently available guidance systems.

DETAILED DESCRIPTION

System Overview

Figure 1:
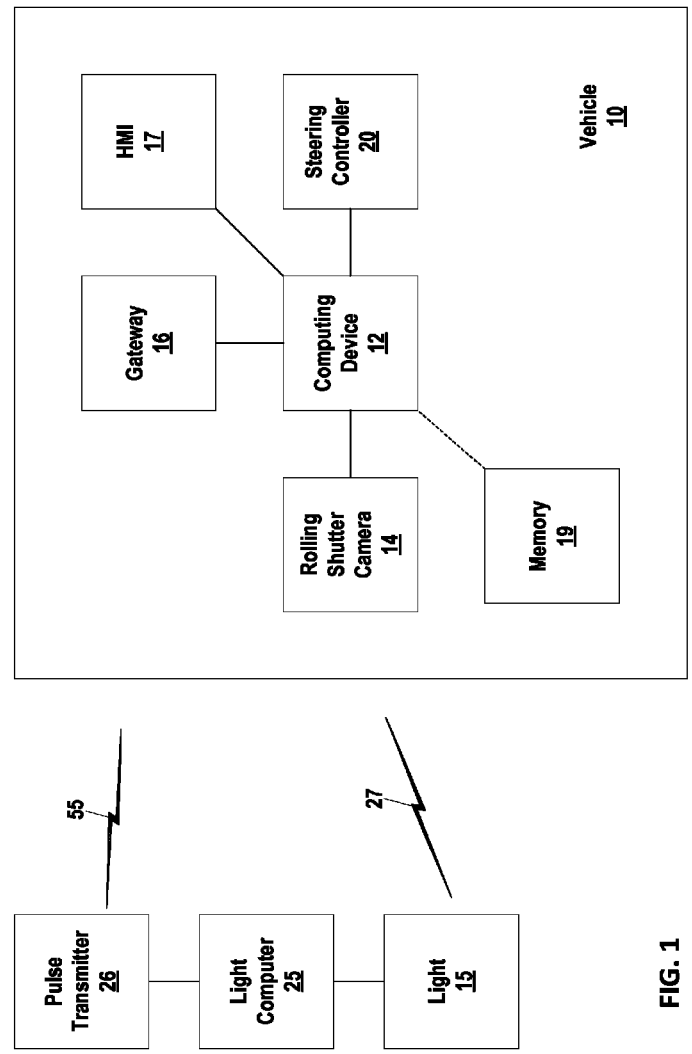
FIG. 1 is a block diagram an exemplary vehicle positioning system.

With reference to the Figures, wherein like numerals indicate like parts throughout the several views, FIG. 1 is a block diagram of an exemplary vehicle guidance system 5 including path detection and correction mechanisms. A vehicle 10 includes a computing device 12 configured to receive data, e.g., images from a rolling shutter camera 14 and a synchronization signal. The computer 12 can also be communicatively coupled to a gateway interface 16 and a steering controller 20. A light controller 25 is communicatively coupled to a light source 15 and a pulse transmitter 26.

Figure 3:
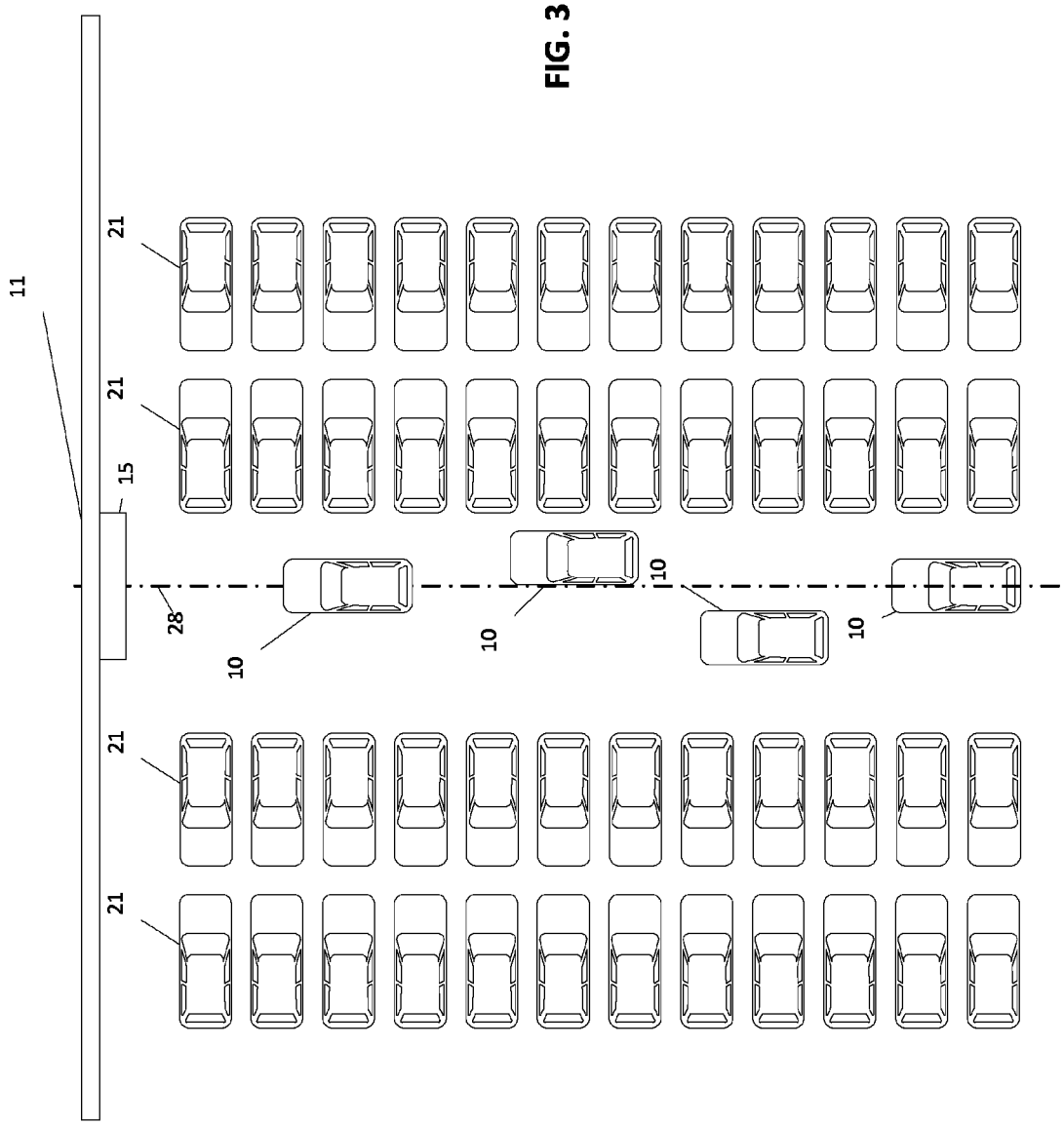
FIG. 3 is block diagram of an exemplary autonomous vehicle correcting its path of travel in a parking structure.

The computer 12 generally includes program code stored in the memory 19 for operating the vehicle 10, either autonomously and/or semi-autonomously, i.e., wholly or partially without operator input. The computer 12 may be programmed to analyze collected images from the camera 14. Such images may indicate to a position of the vehicle 10 traversing a lateral emission axis 28 of the light source 15, also known as a correct path of travel, as shown in FIG. 3. The light source 15 can be a lighted sign or the like in front of the vehicle 10 when the vehicle 10 is traversing an expanse.

Referring back to FIG. 1, the computer 12, e.g., in the memory 19, generally includes instructions for communicating data, e.g., between the computer 12 and the gateway interface 16 the steering controller 20, and a human machine interface (HMI) 17.

The light controller 25, typically a computing device including a processor and a memory, can include programming to modulate and cycle the light 29 emitted from the light source 15. The light source 15 can be incorporated into many types of illuminated signage, e.g., informational signage, directional signage, identification signage, and safety and regulatory signage. The illuminated signage can then be placed in or near vehicle pathways to guide a vehicle 10 while the vehicle 10 is traversing an area, such as a parking lot. The light source of the illuminated signage can be any type to light emitting device, e.g., Light Emitting Diodes (LEDs) or fluorescent light, just to name a few.

The light source 15, can be modulated with a repeating pattern produce a modulated light 27. For example, the light source 15 can be pulse width modulated (PWM) with a unique repeating pattern to uniquely identify the modulated light 27 emitting from the light source 15. The light controller 25 can instruct the light source 15 to turn on and then off (which is also known as a duty cycle) in a repeating pattern of modulated light 27 over a time period 60. In addition, the light controller 25 can instruct the pulse transmitter 26 to transmit a synchronization signal 55 at a beginning of a time period 60. The vehicle 10 receives the synchronization signal 55 and the modulated light 27, and accordingly, the vehicle 10 can determine a path of travel relative from the frequency of the modulation atop the light source 15. The vehicle 10 can then correct its course in the autonomous mode or instruct the driver to make the appropriate adjustments to their course in the semi-autonomous mode of operation.

Exemplary System Elements

A vehicle 10 includes a vehicle computer 12 that generally includes a processor and a memory 19, the memory 19 including one or more forms of computer-readable media, and storing instructions executable by the processor for performing various operations, including as disclosed herein. Further, the computer 12 may include more than one computing device, e.g., controllers or the like included in the vehicle 10 for monitoring and/or controlling various vehicle components, e.g., an engine control unit (ECU), a transmission control unit (TCU), etc. The computer 12 is generally configured for communications on a controller area network (CAN) bus or the like. The computer 12 may also have a connection to an onboard diagnostics connector (OBD-II). Via the CAN bus, OBD-II, and/or other wired or wireless mechanisms, the computer 12 may transmit messages to various devices in a vehicle and/or receive messages from the various devices, e.g., controllers, actuators, sensors, etc., including the gateway interface 16, the steering controller 20, and the HMI 17. Alternatively or additionally, in cases where the computer 12 actually comprises multiple devices, the CAN bus or the like may be used for communications between devices represented as the computer 12 in this disclosure. In addition, the computer 12 may be configured for communicating with the gateway interface 16, which, as described below, may include various wired and/or wireless networking technologies, e.g., cellular, Bluetooth, wired and/or wireless packet networks, etc.

Generally included in instructions stored in and executed in the memory 19 by the computer 12 are instructions to cause the vehicle 10 to perform one or more operations autonomously, i.e., without human intervention or control.

Using data received in the computer 12, e.g., from data camera 14, the gateway interface 16, etc., the computer 12 may control various vehicle 10 components and/or operations without a driver to operate the vehicle 10. For example, computer 12 may regulate vehicle 10 speed, acceleration, deceleration, steering, operation of components such as lights, etc.

Further, the memory 19 may include instructions for decoding the modulation from the modulated light 27, and, according to an evaluation of the modulated light 27, determine a directional movement of the vehicle 10 and/or informing a driver of a necessary maneuver. For example, if the vehicle 10 is in an autonomous mode, a computer 12 analysis of the received image from the camera 14 could indicate that a turn correction, such a left turn is necessary. The computer 12 can then send a command to the steering controller 20 to execute the vehicle 10 turn to the left. In a manual or semiautonomous mode, the computer 12 can inform the driver through the HMI 17 that a turn to the left is necessary.

The light controller 25, generally includes a second processor and a second memory, the second memory including one or more forms of computer-readable media, and storing instructions executable by the second processor for performing various operations, including as disclosed herein. Further, the light controller 25 may include more than one computing device, e.g., controllers or the like for controlling the light source 15 and the pulse transmitter 26.

The pulse transmitter 26 transmits a synchronization signal 55 using a radio frequency signal. Alternatively, the synchronization signal 55 can be a secondary light source or the synchronization signal 55 can be incorporated into the light emitted from the light source 15. The pulse transmitter 26 includes capabilities for wireless communications using an IEEE 802.11 type transmission, such a Wi-Fi signal, a Bluetooth signal, a Near Field Communications (NFC) signal and/or cellular communications signal. Further, the pulse transmitter 26 can use such communication capabilities to communicate via the synchronization signal 55 directly with the vehicle computer 12 via the gateway 16, e.g., using Bluetooth or NFC.

Figure 2:
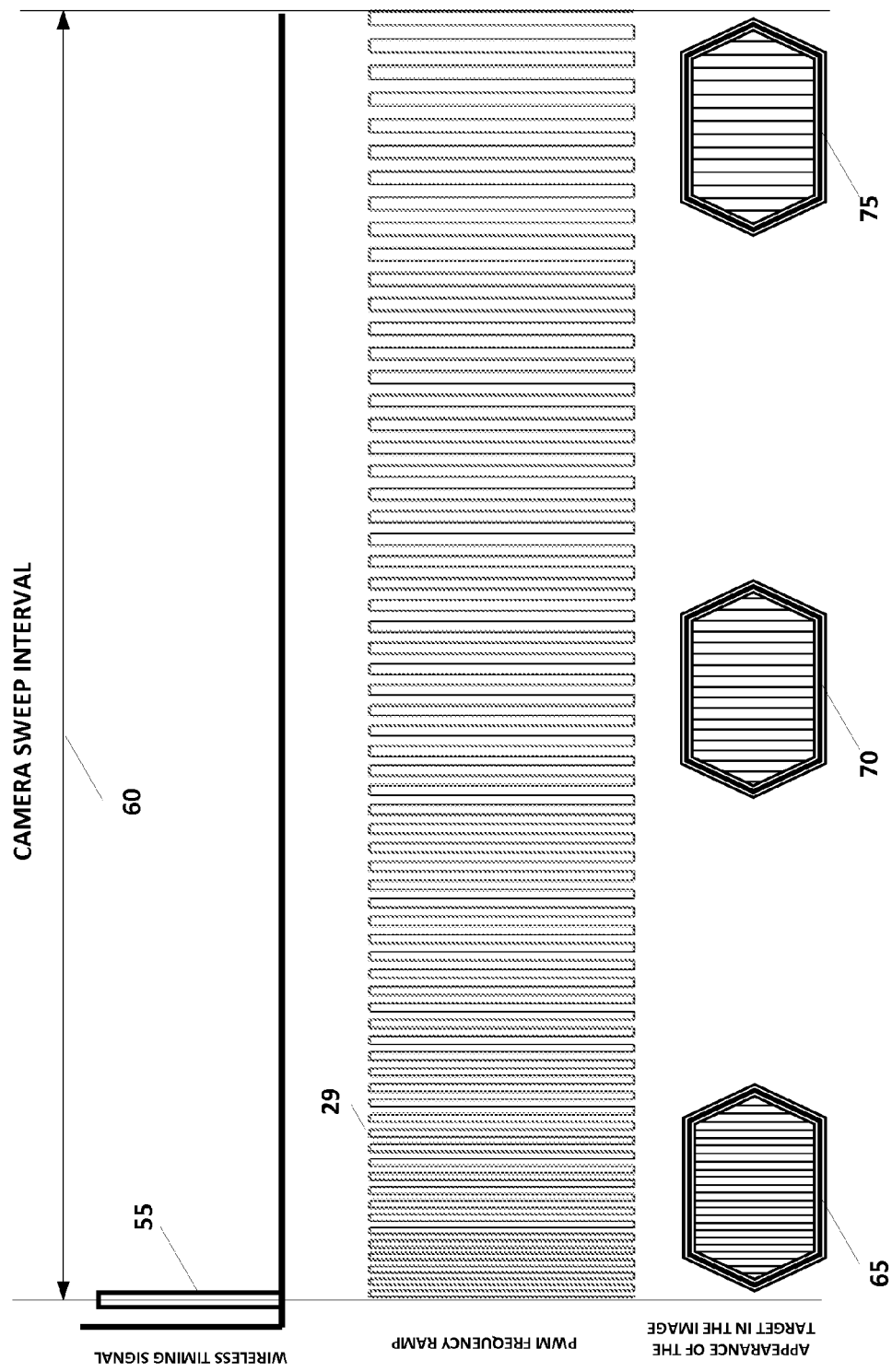
FIG. 2 illustrates an exemplary images from an image sensor of a rolling shutter camera along with images of differing positions along a light's lateral emission axis.

The light controller 25 modulates the light emitting from the light source 15. For example, the light controller 25 can pulse width modulate (PWM) the emitted light with a signal, e.g., with an increasing or decreasing frequency ramp waveform signal to produce a PWM frequency ramp 29, as shown in FIG. 2. In addition, The light controller 25 can maintain a pulse width that keeps an intensity of the modulated light 27 visible to the camera 14 of the vehicle 10 throughout a time period 60. Pulse width modulation, or PWM, is a technique for digital control of light by generating a square wave in which the portion of the time the signal or the light is on versus the time that the signal or the light is off, which is also known as the duty-cycle. The light controller 25 coordinates the transmission of the synchronization signal 55 at the beginning of each frequency ramp cycle, which has the same duration as the time period 60.

The vehicle 10 camera 14 uses a rolling shutter to capture the modulated light 27 on the camera 14 complementary metal oxide semiconductor (CMOS) sensor. The rolling shutter is a well-known technique of image capture in which a still picture is captured not by taking a snapshot of an entire scene at single instant in time, but rather by scanning across the scene rapidly, either vertically or horizontally. In other words, not all parts of an image are recorded at exactly the same instant. The advantage of this method is that the image sensor can continually gather photons during the acquisition process, thus effectively increasing sensitivity. The rolling shutter also produces predictable distortions called "fringes" caused by rapid flashes of light. The fringes allow for enhanced decoding of complex modulations transmitted by the emitted modulated light 27.

When the vehicle 10 camera 14 receives the modulated light 27 from the light source 15, the modulated light 27 illuminates the camera 14 CMOS sensor. The camera 14 rolling shutter is coordinated with the modulated light 27 via the synchronization signal 55 received from the gateway 16. In other words, the rolling shutter starts or coordinates the computer 12 acquisition of data from traversing the CMOS sensor when the synchronization signal 55 is received, which is also the beginning the PWM frequency ramp 29 and the time period 60.

Now with reference to FIGS. 2 and 3, in which the vehicle 10 camera is directly in front of the light source 15, the camera 14 CMOS sensor receives a first frequency image 70. The first frequency image 70 is a representation of the frequency from the aforementioned PWM frequency and PWM duty-cycle. The duty-cycle is exemplified by distinct vertical white (on) and black (off) columns or bands. The computer 12 determines the vehicle 10 position by analyzing the frequency and/or the pulse width of the first frequency image 70 using digital signal processing (DSP). A first frequency of the first frequency image 70 is isolated from the first frequency image 70 and compared to a known stored center frequency. For example, if the vehicle 10 is left of the traversing a lateral emission axis 28, the camera 14 CMOS sensor receives a second frequency image 65 and sends the image to the computer 12. The computer 12 determines that a second frequency of the second frequency image 65 indicates the vehicle 10 is left of the traversing a lateral emission axis 28. The computer 12 can then instruct the steering controller 20 to turn the vehicle to the right until the camera 14 receives the first frequency image 70, indicating the vehicle 10 is again on the traversing a lateral emission axis 28. Conversely, if the vehicle 10 is to the right of the traversing a lateral emission axis 28, an analysis of a third frequency image 75 by the computer 12 causes the vehicle 10 to turn left and continue the left turn un the vehicle is on the traversing a lateral emission axis 28.

Additionally, the synchronization signal 55 can have a turning direction signal encoded into the synchronization signal 55. The turning direction signal indicates when the vehicle 10 should turn and in what turn direction relative to the light source 15. For example, the synchronization signal 55 can include a turn direction signal with a turn direction instruction and a set of pixel data, to turn left ninety degrees when the vehicle 10 is within 10 meters of the light source 15.

To obtain a distance to the light source 15, the vehicle 10 can compare the set of pixel data to the light source 15 image in the camera 14. For example, the light source 15 can be integrated into an informational sign, such as yield sign positioned on a wall in a parking structure. The yield sign has a physical dimensions, e.g., one-meter in a horizontal direction by 50 centimeters in a vertical direction. When the image of the yield sign is captured on the camera 14 CMOS sensor, the image will contain a number of horizontal and vertical pixels. Since the distance to the yield sign and the image of the yield sign have a direct correlation, the computer 12 can determine the distance to the light source 150 by comparing the camera 14 image to a known set of the pixel data. The set of pixel data can be a size of the light source 15 in pixels, an image of the light source 15 or a property of the light source 15 that the computer 12 can determine using digital signal processing.

The set of pixel data can also be an indicator where the vehicle 10 should turn. For example, as the vehicle 10 approaches the light source 15, the computer correlates the set of pixel data to the camera 14 image. When there is a correlation, the computer 12 will execute the turn and using the turn direction to make the appropriate right or left turn. In some instances, the turn direction and the set of pixel data can already be in memory 19 and may not have to be obtained from the synchronization signal 55.

Figure 4:
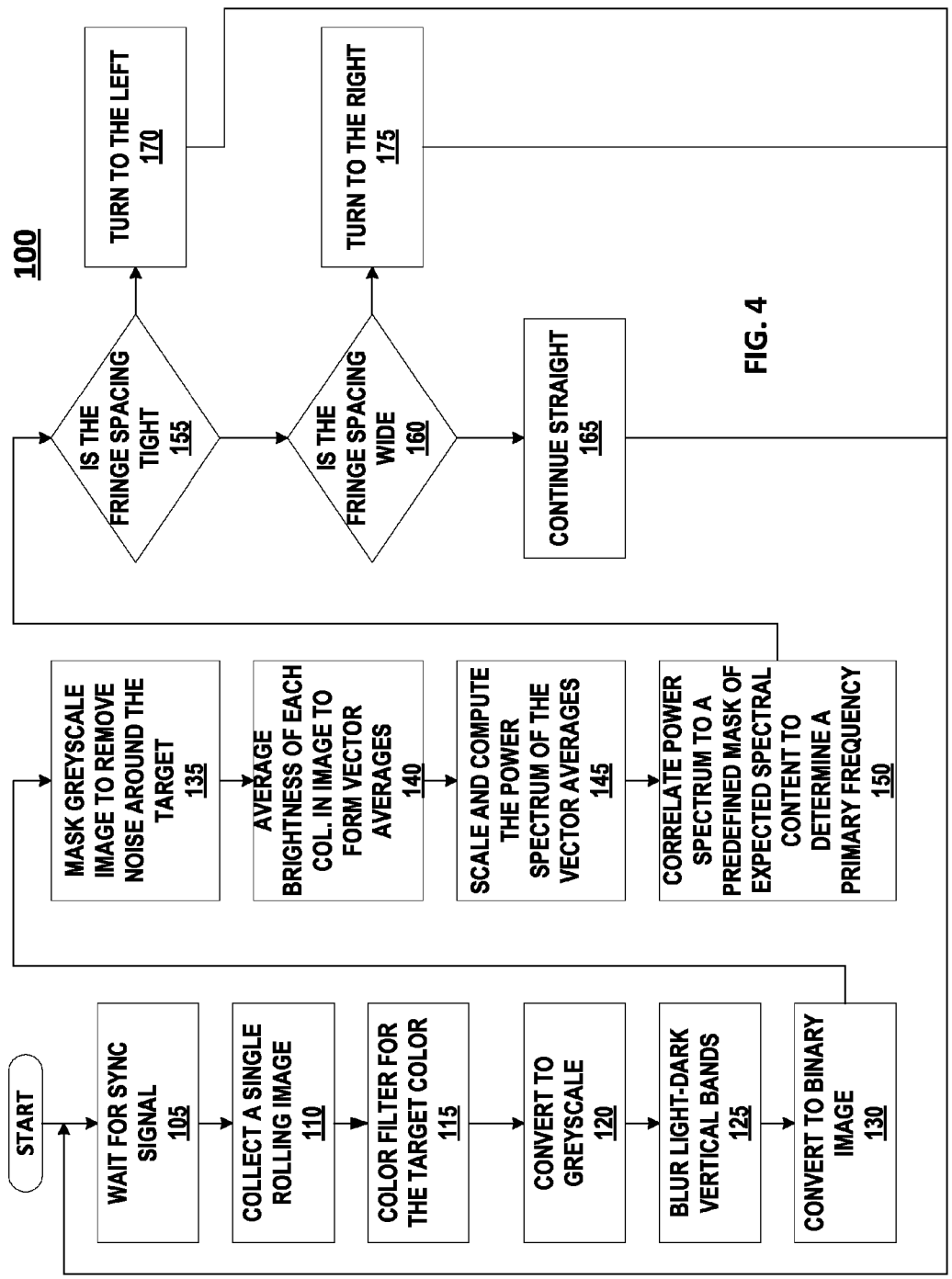
FIG. 4 is a diagram of an exemplary process for reception of a light source for positional determination using digital signal processing (DSP) techniques with a mask of expected content to determine a primary frequency.

FIG. 4 is a diagram of an exemplary process 100 for the modulated light 27 from a light 15 for positional determination using digital signal processing (DSP) techniques with a mask of an expected primary frequency image.

The process 100 begins in a block 105, which may also follow in a blocks 165, 170 or 175 as described below. In the block 105, the computer 12 waits for the reference synchronization signal 55 from the gateway 16. Once the synchronization signal 55 is received, the process 100 continue in a block 110.

In the block 110, the camera collects a rolling shutter image. The rolling shutter technique, as discussed above, retrieves a rolling shutter image from the CMOS sensor by scanning across the CMOS sensor, either vertically or horizontally, e.g., line-by-line or column-by-column, rather than collecting the CMOS sensor's data in one block of image data. For example, the camera 14 captures the first frequency image 70 and sends it to the computer 12.

In the block 115, the computer can filter the rolling shutter image for a specific color of light in the light spectrum to produce a color image. The For example, the modulated light 27 may be in the infrared spectrum, whereupon the computer 12, using DSP digital filter techniques, can then remove the rest of the light spectrum leaving only the infrared light. A digital filter is a technique that performs mathematical operations on a sample image, such as on the first frequency image 70 to reduce or enhance certain aspects of that image and to produce a first color filtered image.

Following the block 115, in a block 120, the computer 12 may convert the color image into a grayscale image. A grayscale image is an image in which the value of each pixel of an image 70 is converted into an image with only intensity information using DSP. Images of this sort, also known as black-and-white images, are composed exclusively of shades of gray, varying from black at the weakest intensity to white at the strongest. For example, the computer 12 may convert the first color filtered image produced in the block 115 to a first grayscale frequency image.

Following the block 120, in a block 125, the computer 12 using DSP blurs the light-bands and the dark-bands of the grayscale image to produce a blur image. For example, the computer 12 can blur the first grayscale frequency image to create a first blurred frequency image. When an image is blurred, the edge content is reduced, which smooths the transition from one color to another. Blurring can be achieved by many common type of filters. For example, a mean filter, or a weighted average filter or a Gaussian filer can perform image blurring, just to name of a few of the filters available for image processing.

Following the block 125, in a block 130, the computer 12 using DSP converts the blur image to a binary image, in which each pixel element, or group of pixel elements of the blurred image, is quantized, i.e., assigned a numerical value. The computer 12 can convert the first blurred frequency image produced in the block 125 to a first binary frequency image. For example, a black pixel element of the blur image can be assigned a value of zero, while a white pixel element can be assigned a value of 255, with 254 shades of gray pixels in between the black with a zero value and the white with a 255 value. In addition, the computer 12 can perform a probability mass function (PMF) and a cumulative distributive function (CDF) on the first binary frequency image. The PMF gives the count or frequency of each pixel element and the CDF gives the count or frequency of each pixel element. From PMF and CDF, the computer can then use histogram equalization to enhance the contrast of the first binary frequency image.

Following the block 130, in a block 135, the computer 12 using DSP for masking a noise value from the binary image, which removes noise from around the light-band columns and the dark-band columns to produce a noise masked image. The computer 12 disregards any pixel elements below a certain noise threshold value. For example, the noise threshold value can be a value which takes into account the vehicle 10 internal system's noise, such as Radio Frequency Interference generated by the vehicle 10 electronics. The computer 12 can mask the first binary image produced in the block 130 to produce a first noise masked image.

Next, in a block 140, the computer 12 using DSP can determine an average brightness of each column in the noise masked image to generate an average of vectors of the light-band columns and the dark-band columns. For example, the computer 12 determines the average brightness of each column in the first noise masked image to generate a first average of vectors of the light-band columns and a second weighted set of vectors of the dark-band columns. In other words, the computer 12 using DSP, groups the vertical light columns together and separates them from the dark columns to produce a pattern of light and dark vertical columns.

Following the block 140, in a block 145, the computer 12 using DSP scales and computes a power spectrum of the average of vectors of the light-band columns and the dark-band columns. In other words, the computer 12, using DSP, further refines a distinction of the light-band columns and the dark-band columns.

Next in a block 150, the computer 12 using DSP cross correlates the power spectrum of the average of vectors of the light-band columns and the dark-band columns to a predefined mask. The predefined mask is derived from an estimation of an expected primary frequency. If the estimated predefined mask frequency is not correct, the computer 12 will generate a correction and redefine the predefined mask for possible use in a next iteration of this block 150.

Following the block 150, in a block 155, the computer 12 using DSP determines if a spacing between the columns is narrower than a reference column value. Narrower columns indicate a higher frequency as compared to wider columns, as the columns can represent a relative time period between a peak and trough of the repeating pattern. The reference column value can be obtained when the camera 14 is directly in line with the traversing a lateral emission axis 28 as illustrated in FIG. 3. If the spacing between the columns is narrower than the reference column value, the process continues in a block 170, else the process continues in a block 160.

In the block 160, the computer 12 using DSP determines in the spacing between the columns is wider than the reference column value. If the spacing between the columns is wider than the reference column value, the process continues in a block 175, else the process continues in a block 165.

In the block 165, the computer 12 may confirm that the spacing between the columns is the same as the reference column value to confirm that the vehicle is on the lateral emission axis 28 and the process 100 continues in a block 175.

In the block 170, the computer 12 instructs the steering controller 20 to execute a left turn to a specified direction which gets the vehicle 10 to the lateral emission axis 28. The process 100 then continues in the block 105.

In the block 175, the computer 12 instructs the steering controller 20 to execute a right turn to the specified direction which gets the vehicle 10 to the lateral emission axis 28. The process 100 then continues in the block 105.

Figure 5:
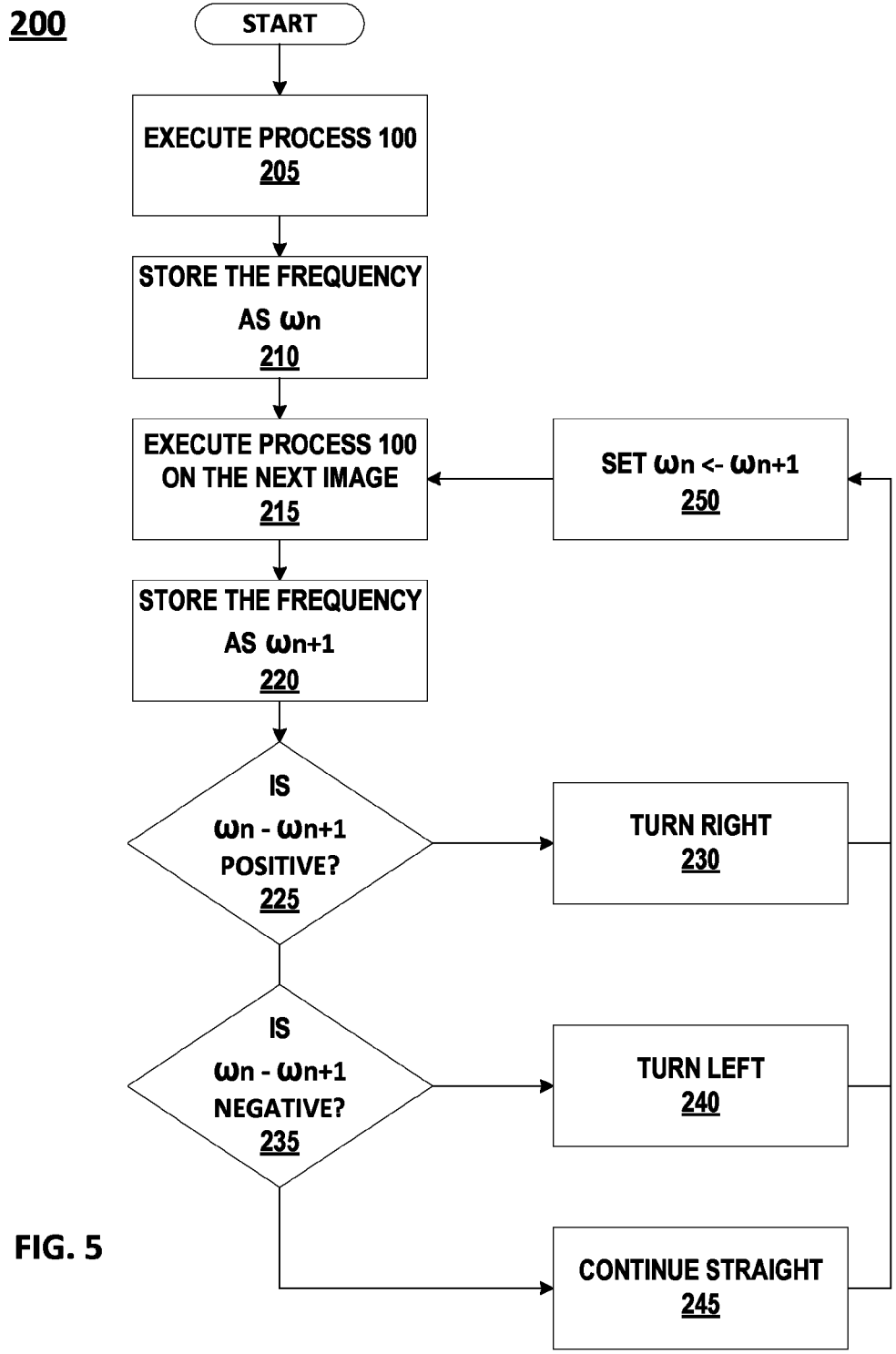
FIG. 5 is a diagram of an exemplary process for reception of a light source positional determination using digital signal processing (DSP) techniques without having to know the primary frequency in advance.

FIG. 5 is a diagram of an exemplary process 200 for reception of a software controlled light source positional determination using digital signal processing (DSP) techniques without having to know the primary frequency in advance.

The process 200 begins in a block 205, in which a single iteration of the process 100 is executed. Next in the block 210, a frequency value of the primary frequency found in the block 150 of process 100 is stored in a first memory.

Following in the block 210, in a block 215, which may also follow the block 250, a single iteration of the process 100 is again executed.

Next in the block 220, the primary frequency found in the block 150 of the process 100 is stored in a second memory.

Following in the block 220, next in a block 225, the computer 12 determines if a result of the primary frequency value stored in the first memory subtracted from the primary frequency value stored in the second memory is a positive value. The computer 12 also stores the result in a third memory. If the difference is positive, the process 200 continues in a block 230, else the process 200 continues in the block 235.

In the block 230, the processor sends an instruction to the steering controller 20 to turn right a proportional value of an absolute value of the difference of the primary frequencies found in the block 225. For example, the primary frequency my be 1000 Hertz when the vehicle 10 is aligned with the lateral emission axis 28 of the light 15. If the vehicle 10 were one meter to the left of the lateral emission axis 28, the primary frequency may be 900 Hertz. The difference between the two frequencies is 100 Hertz or ten percent. The computer 12 may instruct the steering controller 20 to turn the vehicle 10 right ten percent of the vehicle 10 maximum left turn capability until the vehicle 10 is again aligned with the lateral emission axis 28. In another example, the proportional value can come from a proportional-integral-derivative (PID) calculation. PID correction is a well know control loop feedback mechanism which calculates an error value as the difference between the vehicle 10 position as determined and a desired path of travel along the lateral emission axis 28. The process 200 than continue in a block 250.

Alternatively following in the block 225, next in the block 235, the computer 12 determines if the primary frequency value stored in the first memory subtracted from the primary frequency value stored in the second memory is a negative value. If this difference is negative, the process 200 continues in a block 245, else the process 200 continues in the block 240.

In the block 240, the processor sends an instruction to the steering controller 20 to turn left a proportional value of an absolute value of the difference of the primary frequencies found in the block 235. The process 200 than continue in the block 250.

In the block 245, the computer 12 confirms there is neither a positive nor negative difference between the two primary frequency values. The process 200 continues in the block 250.

In the block 250, which may follow in the blocks 230, 240 or 245, a second memory value replaces the first memory value. The process 200 continues to the block 215.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Nonvolatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method comprising:
receiving a synchronization signal and collecting a rolling shutter image of a modulated light on a sensor, the rolling shutter image including a plurality of images of locations along a path of travel of a vehicle;
determining a primary frequency from the rolling shutter image; and
comparing the primary frequency to an expected primary frequency image to determine a directional movement related to the vehicle.

2. The method of claim 1, further comprising, correlating the rolling shutter image to a set of pixel data to determine a vehicle to light source distance.

3. The method of claim 2, further comprising, causing the vehicle to execute one of a right turn and a left turn based upon a turn direction instruction.

4. The method of claim 1, wherein the modulated light is provided according to a signal that is an increasing or decreasing frequency ramp waveform signal.

5. The method of claim 4, further comprising receiving the synchronization signal at a start of the frequency ramp waveform signal.

6. The method of claim 1, wherein the synchronization signal is one of a Bluetooth signal, a Wi-Fi signal, and a near field communications signal.

7. The method of claim 3, wherein the set of pixel data and the turn direction instruction are in a memory.

8. The method of claim 3, wherein the set of pixel data and the turn direction instruction are included in the synchronization signal.

9. The method of claim 1, wherein the synchronization signal is one of a radio frequency signal and a second light source.

10. The method of claim 1, further comprising:
filtering the rolling shutter image with a color filter;
converting the rolling shutter image into a grayscale image;
blurring the grayscale image;
converting the grayscale image to a binary image;
masking a noise value from the binary image;
forming an at least one vector average of the binary image by averaging a brightness of the binary image;
determining a power spectrum of the at least one vector average; and
correlating the power spectrum of the at least one vector average to a predefined mask to determine a specified direction.

11. The method of claim 10, further comprising:
storing the primary frequency as a first memory value;
receiving the synchronization signal and collecting the rolling shutter image of the modulated light on the sensor;
determining the primary frequency from the rolling shutter image;
storing the primary frequency as a second memory value;
subtracting the second memory value from the first memory value and storing a difference as a third memory value; and
causing the vehicle to execute one of a right turn and a left turn; wherein the specified direction is for a right turn if the difference is a positive value and for a left turn if the difference is a negative value.

12. The method of claim 11, further comprising determining the specified direction from the path of travel and a difference of the first memory value and the second memory value.

13. The method of claim 11, further comprising determining the specified direction from a proportional-integral-derivative (PID) using the difference of the first memory value and the second memory value.

14. A system, comprising a computer in a vehicle, the computer including a processor and a memory, the memory storing instructions executable by the processor to:
receive a synchronization signal and collect a rolling shutter image of a modulated light on a sensor, the rolling shutter image including a plurality of images of locations along a path of travel of a vehicle;
determine a primary frequency from the rolling shutter image; and
compare the primary frequency to an expected primary frequency image to determine a directional movement related to the vehicle.

15. The system of claim 14, wherein the rolling shutter image is compared to a set of pixel data to determine a vehicle to light source distance.

16. The system of claim 14, wherein the vehicle will execute one of a right turn and a left turn based upon a turn direction instruction.

17. The system of claim 14, wherein the modulated light with a signal that is an increasing or decreasing frequency ramp waveform signal with the synchronization signal at a start of the frequency ramp waveform signal.

18. The system of claim 14, wherein the computer further executes instructions by the processor to:
filter the rolling shutter image with a color filter;
convert the rolling shutter image into a grayscale image;
blur the grayscale image;
convert the grayscale image to a binary image;
mask a noise value from the binary image;
form at least one vector average of the binary image by averaging a brightness of the binary image;
determine a power spectrum of the at least one vector average; and
correlate the power spectrum of the at least one vector average to a predefined mask to determine a specified direction.

19. The system of claim 14, wherein the computer further executes instructions by the processor to:
store the primary frequency as a first memory value;
receive the synchronization signal and collect the rolling shutter image of the modulated light on the sensor;
determine the primary frequency from the rolling shutter image;
store the primary frequency in a second memory value;
subtract the second memory value from the first memory value and store a result in a third memory value; and execute one of a right turn and a left turn; wherein a specified direction is for a right turn if the difference is a positive value and for a left turn if the difference is a negative value.

20. The system of claim 14, wherein the specified direction from the path of travel and a difference of the first memory value and the second memory value.

* * * * *